Figure 1:
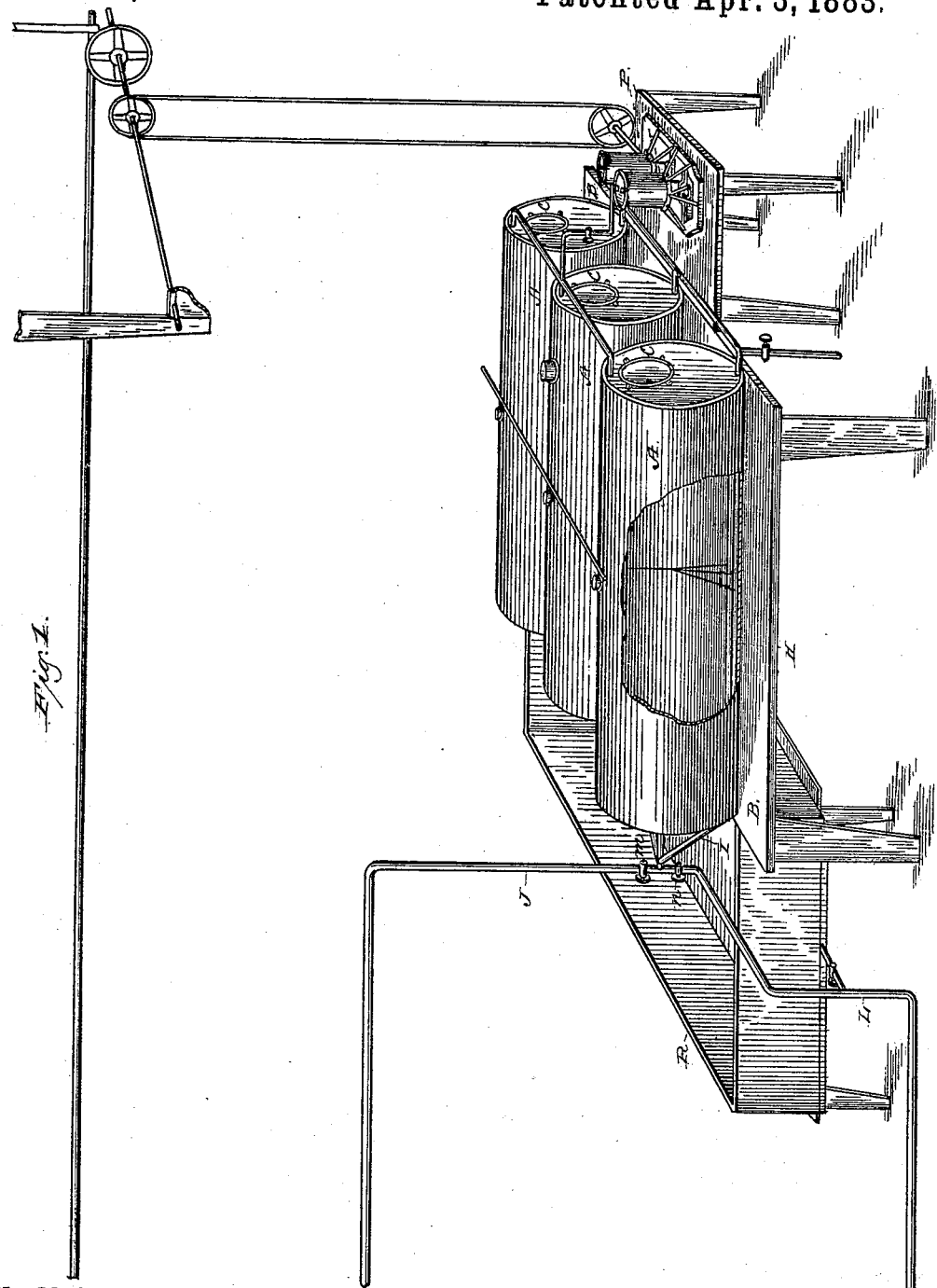

(Model.)

E. R. POWELL.
TREATMENT OF MILK FOR THE MANUFACTURE OF BUTTER AND CHEESE.

No. 275,263. Patented Apr. 3, 1883.

2 Sheets—Sheet 1.

Witnesses:
J. C. Clark.
Louis F. Gardner

Inventor
Edwin R. Powell
Per Charles E. Allen,
Attorney.

(Model.) 2 Sheets—Sheet 2.
E. R. POWELL.
TREATMENT OF MILK FOR THE MANUFACTURE OF BUTTER AND CHEESE.
No. 275,263. Patented Apr. 3, 1883.
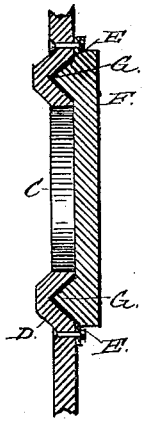
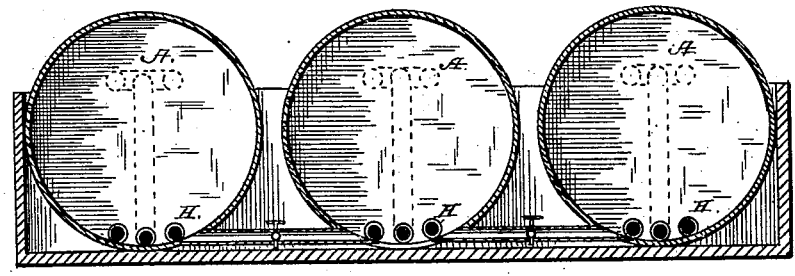

UNITED STATES PATENT OFFICE.

EDWIN R. POWELL, OF BURLINGTON, VERMONT.

TREATMENT OF MILK FOR THE MANUFACTURE OF BUTTER AND CHEESE.

SPECIFICATION forming part of Letters Patent No. 275,263, dated April 3, 1883.

Application filed December 27, 1882. (Model.)

*To all whom it may concern:*

Be it known that I, EDWIN R. POWELL, of Burlington, in the State of Vermont, have invented a certain new and useful Improvement in the Treatment of Milk for the Manufacture of Butter and Cheese, and for other purposes, of which the following is a specification.

The object I have in view is to bring milk to a condition in which, as far as possible, all of its useful elements are made available for the manufacture of butter and cheese, and for other uses to which it may be put.

To this end I have devised a novel process of treating milk, which consists essentially in first heating or raising the temperature of the milk, and subsequently cooling it, at the same time exhausting the air from the vessel in which it is contained. The heating, which is the first step, hastens and renders more thorough the separation of the butter or fatty globules which compose the cream from the body of the milk, and aids to develop in the latter to a noticeable extent the saccharine element which it is well known it contains.

Inasmuch as it is known that some liquids after boiling or being heated become sweeter, and that this increased sweetness is attributable to a saccharine element which, more or less latent before, is developed by the heating operation, it is not improbable that the operations of heating the milk and then exhausting the air from above it as soon as this can be safely done (which last step of course lowers the boiling-point of the milk) have the effect of developing the sugar element of the milk. At any rate, to whatever cause it may be attributable, the fact is that the milk after this treatment is decidedly sweeter to the taste than it was before, and is brought to a condition in which, when it is subsequently made into cheese, its saccharine element is to a great extent retained in the curd, a very small percentage only passing off with the whey; and I am thus enabled to obtain from the same amount of milk a greater quantity and a better quality of cheese than is practicable under any other existing process of treatment known to me. Cream has in some cases been raised by subjecting the milk to the vacuum treatment alone or in conjunction with the cooling step; but these methods are ineffective in the respect above noted, and they also fail to bring about thorough separation of the fatty globules from the body of the milk. In other cases milk for the same purpose has been first heated and then cooled; but this process also is ineffective to develop the saccharine element of the milk, for the milk during the process is under ordinary atmospheric pressure, and must therefore, in order to develop its sweetness, be raised to a temperature so high as to injure the caseine and the butter-making elements, which of course mould be inadmissible. In my process the temperature should not under any circumstances be raised as high as the scalding-point, and I find that practically it is not necessary to heat the milk above 120° Fahrenheit, or even lower. If air be exhausted above the milk while at this temperature, the milk will be in a state of ebullition. I therefore do not put the vacuum-pump in operation until the temperature of the milk (by the action of the cooling agent, which is applied as speedily as possible) has fallen to about 110°. Under these conditions, when the operation of exhausting the air goes on, and until the temperature of the milk has been very considerably reduced, vapor containing animal and other impurities rises from the milk and is carried off. The effect of the process is thus to purify the milk also.

It will be noted that I do not wait for the milk to cool before putting the vacuum-pump in action, but that the air is exhausted while the milk is still in heated condition, and it is perhaps to this feature that the development of the sugar element of the milk is mainly attributable.

I here remark that I am aware that milk has been condensed or concentrated by evaporation *in vacuo*, heat being applied and maintained until the requisite degree of concentration is reached. This, however, is manifestly foreign to my invention and is not included in my claims.

To a better understanding of my invention I have deemed it proper to represent in the drawings accompanying this specification one form of apparatus in which it can be practiced.

Figure 1 is a perspective view of the apparatus, and Figs. 2 and 3 are detail views of the same.

A represents one or more cylindrical tanks, placed horizontally upon a suitable support, B, and made preferably of sheet metal with cast-iron heads C. They are connected together by means of pipes provided with cocks at their bottoms, so that the milk poured into any one will rise to an equal height in the others, or can be confined to that one tank alone, as preferred. Through each head is made an opening, around which is a groove, D, in which is placed a rubber packing, E. The covers F for these holes are provided with ears, by means of which they can be bolted to the heads, and each cover has a flange, G, formed on its inner face to enter the groove, and thus form an air-tight joint. The pressure of the external atmosphere at the time the air is exhausted from the tanks will cause the covers to close the openings perfectly air-tight. Placed in each tank is a series of pipes, H, which are connected to suitable pipes at each end by means of flexible connections, so that the pipes can be raised or lowered through the milk at the will of the operator. These pipes H are raised and lowered through the milk more or less slowly for the purpose of bringing the pipes into intimate contact with a much greater portion of the milk in the same time than can be done if they remain stationary. When the pipes remain stationary the whole body of the milk will have its temperature raised or lowered only by the circulation that is started, and this takes a much longer time to accomplish. The series of pipes H are here shown as connected to a rod, which extends across the tops of the tanks; but I do not limit myself to this or to any other mechanism for moving the pipes, for this manifestly may be done in a number of ways.

Passing into the rear ends of the tanks are the pipes I, which are connected with both a steam-pipe, J, and a cold-water pipe, L. The steam-pipe is connected with a boiler, so as to convey steam to the series of pipes placed in the tanks for the purpose of raising the temperature of the milk to about 120° Fahrenheit. After the temperature of the milk has been raised to this point, which will require from twenty minutes to one and a half hour, according to the quantity of milk in the tank, the steam is shut off by means of a suitable cock, M, and the cock N is opened, so as to allow cold water to pass through the same pipes through which the steam was first passing, and thus lower the temperature of the milk in the tanks to about 110°. Lowering the temperature of the milk at the bottom of the tank causes the fatty globules to rise more readily to the top, for the reason that their specific gravity is less than that of the watery elements of the milk in the bottom of the tank. To assist this cooling process the lower portion of the milk-tanks may be placed in a suitable jacket, designed to contain ice or cold water, to cool the milk from the outside, the ice or cold water being placed in the jacket at the same time the cold water is being forced through the series of pipes H. I do not, however, limit myself to the use of ice or water for the purpose of cooling the milk, for that may be done in any way that may be preferred. After the temperature of the milk has been lowered to about 110° the vacuum-pumps P, which may be of any suitable known construction, are set in motion, so as to exhaust the air from the tanks. The cooling of the milk goes on until its temperature is brought down as low as about 40° or 42° Fahrenheit, and the vacuum-pumps are kept in action, so as to maintain the vacuum during the cooling operation, which continues for a number of hours—usually from twelve to fifteen—but dependent, of course, upon the quantity of milk under treatment and other conditions. At the end of this time the cream is thoroughly separated from the milk, and the latter will be found rich and sweet to the taste. This completes the process, and the product can be put to any desired use. For instance, if it be desired to separate the milk from the cream for cheese-making purposes, it can be drawn off at once from the tanks and run into a vat, R, where it can be made into cheese in the usual way.

What I claim, and desire to secure by Letters Patent, is as follows:

1. The described process of treating milk for the manufacture of butter and cheese or for other purposes, which consists in first heating or raising the temperature of the milk, and then cooling the same *in vacuo*, substantially as hereinbefore set forth.

2. In the treatment of milk for the manufacture of butter and cheese or for other purposes, the method of developing the saccharine properties of the milk, which consists in exhausting the air from the milk-containing vessel while the milk therein is in heated condition, substantially as hereinbefore set forth.

In testimony whereof I affix my signature in presence of two witnesses.

EDWIN R. POWELL.

Witnesses:
CHARLES E. ALLEN,
LUCIEN O'BRIEN.